United States Patent [19]

Coulon

[11] Patent Number: 5,575,102

[45] Date of Patent: Nov. 19, 1996

[54] APPARATUS FOR EXCLUSION OF DEBRIS AND BY-CATCH FROM BOTTOM TRAWLS

[75] Inventor: Dennis J. Coulon, Barataria, La.

[73] Assignees: Vincent Wiseman; Charles Tranchant, both of Lafitte, La.

[21] Appl. No.: 405,088

[22] Filed: Mar. 16, 1995

[51] Int. Cl.⁶ .................................................. A01K 73/02
[52] U.S. Cl. ................................................. 43/9.2; 43/104
[58] Field of Search ........................... 43/9.1, 9.2, 104, 43/9.3, 9.4, 9.7, 6.5

[56] References Cited

U.S. PATENT DOCUMENTS

| | | | |
|---|---|---|---|
| 3,015,903 | 1/1962 | Willingham | 43/9.2 X |
| 3,440,752 | 4/1969 | Minter | 43/9.2 X |
| 4,739,574 | 4/1988 | Saunders | 43/9.2 |
| 5,076,000 | 12/1991 | Anthony | 43/9.2 |
| 5,222,318 | 6/1993 | Stokes, Jr. et al. | 43/9.2 |

FOREIGN PATENT DOCUMENTS 20017  1/1930  Australia ................................. 43/9.7

*Primary Examiner*—J. Elpel
*Attorney, Agent, or Firm*—Robert N. Montgomery

[57] ABSTRACT

A shrimp trawl net excluder device which excludes debris and turtle size sea creatures, fin-fish and other such marine life while allowing the desired shrimp catch to be retained. A hoop is provided in association with or adapted to such hard framed excluder devices, having a spoiler plate which directs the flow of water directly into the excluder grating forming a fast moving current which serves as a water curtain. The water curtain allows debris, fin-fish, and other unwanted sea creatures to pass unobstructed through an unobstructed aperture in the net, located directly above the excluder, thus eliminating the need for a net flap or gate apparatus.

7 Claims, 2 Drawing Sheets

APPARATUS FOR EXCLUSION OF DEBRIS AND BY-CATCH FROM BOTTOM TRAWLS

SPECIFICATION

Background of the Invention

1. Field of the Invention

This invention relates generally to shrimp nets and apparatus associated therewith used for shrimp trawling. More specifically it discloses an attachment for various turtle exclusion devices known simply as "TEDs" or TED which are now incorporated by law into shrimp trawling nets.

2. General Background

As a result of the decimation of protected sea creatures such as the sea turtle, the National Marine Fisheries, a branch of the United States Government, now requires the use of turtle excluder devices in all shrimp trawling nets. Such devices are required to be built into all shrimp nets in a manner which allows the turtles to escape. Recently, even more pressure has been placed on the shrimping industry to also reduce the number of fin-fish (by-catch) caught in the shrimp nets. TEDs cause many problems for the shrimper, one of which is the reduction in shrimp catch. There are several factors which contribute to such losses. According to current practice, shrimp trawling nets consist of very large open mouth portions which taper progressively as they trail away from the towing vessel, narrowing to a cylindrical section known as the "cod," "bag" or "sock" end which receives the catch. Single grid hard TEDs, which are the most common in the Gulf, are usually rigid, deflector grids forming a grill work. Such TEDs usually comprise a frame having vertical bars with spacing not exceeding 4 inches, and they are generally woven or sewn into the narrow portion of the net at the mouth of the "sock" end of the net. They generally are positioned at an acute angle of between 30–50 degrees. A portion of the net in front of and above the TED is left loose as a trap door for the turtle and other large by-catch to escape as a result of contact with the TED. Openings are required to be at least 25×25 inches in Gulf waters. Problems occur when debris begin to accumulate on the TED and the trap door portion of the net. Debris clinging to the TED itself or to the trap door netting creates severe water turbulence which may in turn cause the trap door to remain in a partially open condition. As a result of the large opening this condition causes an out-flow of fast moving water. Such water turbulence tends to take a large percentage of shrimp out of the net preventing them from entering the "sock." Although there have been several TEDs developed which claim to reduce blockage of debris thrown up from the bottom by the net, none have proven effective because they did not address the problem of debris build up on the trap door netting as well.

SUMMARY OF THE PRESENT INVENTION

As discussed above many problems exist with Turtle Exclusion Devices in present use. The primary reason being the tendency of the devices to become clogged with debris. Devices which have addressed this problem in the past overlooked the key element of how to prevent debris from being drafted into the sock or becoming entangled in the loose flap over the TED. Heretofore, it was believed that having an opening above or below the TED would simply release a considerable amount of the shrimper's catch. It has now been discovered that debris accumulation seems to be inevitable and the problem is compounded as debris build-up on the loose flap. The instant invention offers the concept that a net flap (trap door) over the TED is not necessary at all, resulting in a free flow of debris over and away form the TED, less water turbulence and more shrimp catch. The instant invention comprises a hoop and struts which may be made adaptable for most hard TEDs. The hoop is also fitted with a deflector plate to further reduce turbulence and direct a sheet of fast moving water towards the TED. This faster flowing water becomes a water curtain effectively retaining the shrimp while allowing turtles, fin-fish and the heavier, more bulky debris to pass through unrestricted. This invention is provided as a newly configured TED or may be adapted to existing HARD TEDs and is especially designed to help reduce debris build up on the TED. Therefore, effectively solving the problem of catch loss attributed to TEDs.

Since the instant invention can work effectively with almost any of the approved hard TED designs, it is an object of the invention to provide an apparatus which eliminates the need for a net flap over the TED.

It is a further object of the invention to provide an excluder device for a shrimp net which utilizes a water curtain to contain shrimp while passing fin-fish, turtles and debris in an unobstructed manner through the water curtain.

It is still a further object of the present invention to provide a hoop attachment for TEDs having the ability to stabilize and direct the water flow passing through the TED while effectively purging debris thus resisting debris build up.

BRIEF DESCRIPTION OF THE DRAWINGS

For a further understanding of the nature and objects of the present invention, reference should be had to the following detailed description in conjunction with the accompanying drawings, in which, like parts are given like reference numerals, and wherein.

DETAILED DESCRIPTION OF TEE PREFERRED EMBODIMENT

Figure 1:
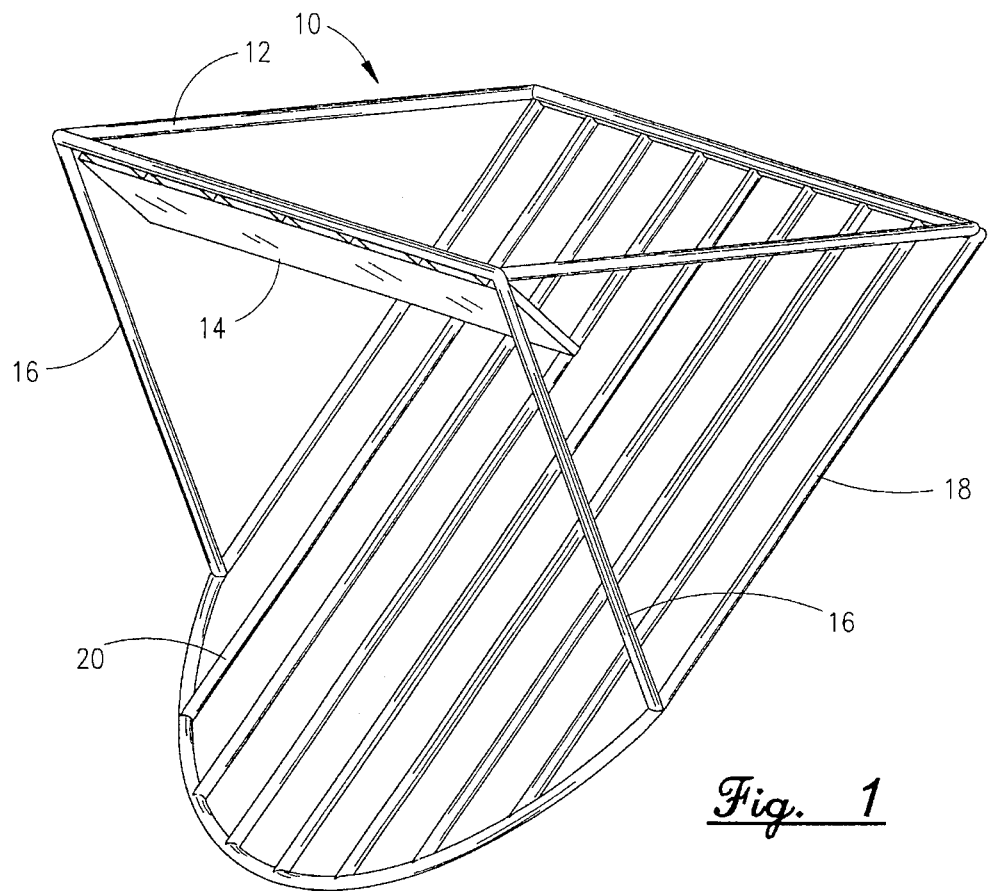
FIG. 1 is an isometric view of the apparatus attached to a hard TED.
Figure 2:
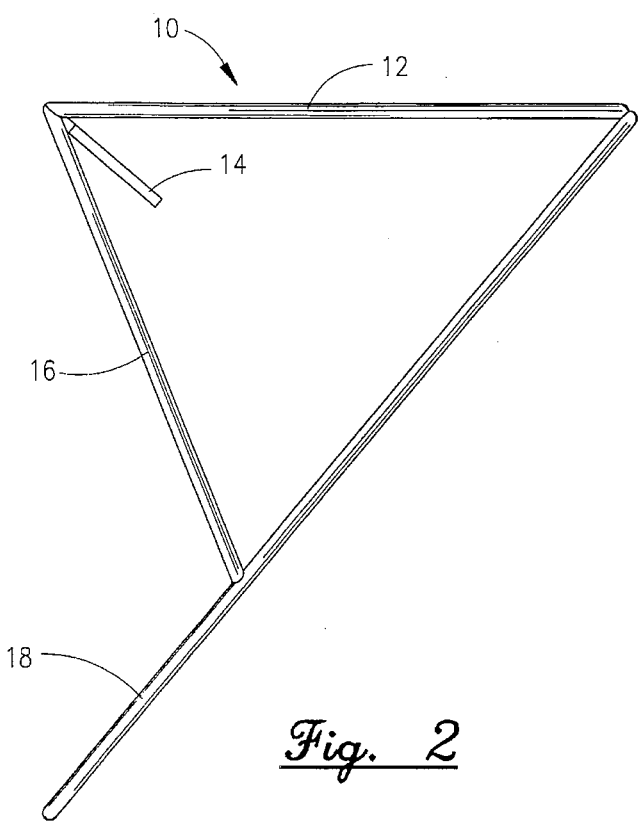
FIG. 2 is a side elevation view of FIG. 1.

FIG. 1 illustrates how the instant invention 10 comprising a hoop 12, a spoiler 14 and bracing members 16 which may be attached to a hard TED 18. Since there are many different shapes and sizes of TEDs, it should be understood that the hoop 12, its spoiler 14 and bracing 16 can be sized and shaped to meet any TED 18 configuration. However, it is essential that adequate space be provided as required by law between the spoiler 14 and the grate 20 to allow for turtles and fin-fish to escape. It is also essential that the spoiler 14 be directed in a substantially perpendicular manner towards the grate 20.

The attachment of the hoop 12 and bracing 16 may be made by any desired method of fastening including welding, mechanical clamps, tubular sockets etc.

Figure 3:
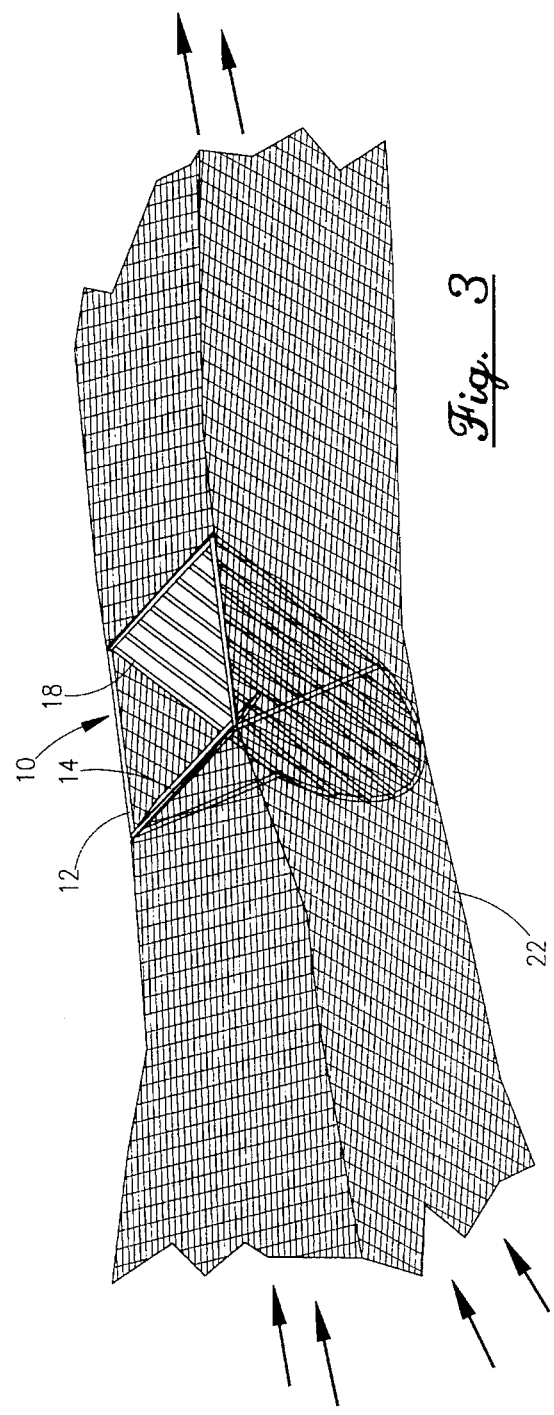
FIG. 3 is an isometric view of the combination shown in FIG. 1 installed in a trawl net.
Figure 4:
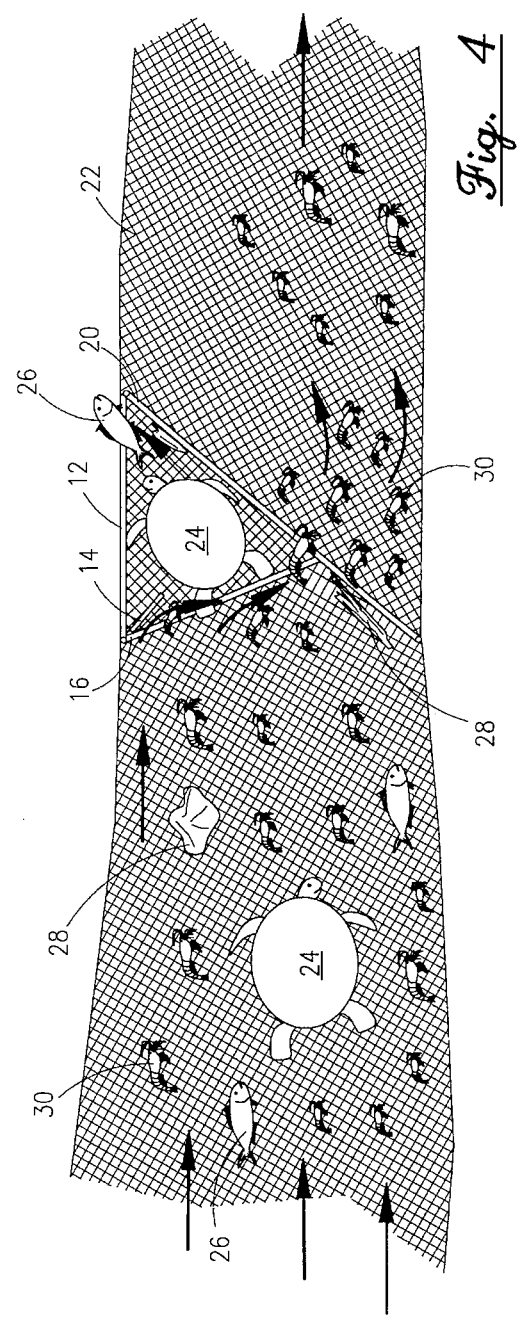
FIG. 4 is a pictorial side elevation illustration of the apparatus shown in FIG. 1 installed in a trawl net showing functionality.

As seen in FIG. 3 the TED 18 and the instant invention attachment 10 would be installed in its usual manner such as with the TED 18 inclined between 30 and 50 degrees with the hoop 12 forming a square or rectangular opening in the top of the net 22 essentially parallel to the flow of water through the net 22 and the TED 18 towards the cod or catch end. As seen in FIGS. 3 & 4 no net flap or mechanical trap door is required over the top of the hoop 12 and the TED 18. Therefore, turtles 24, fin-fish 26 and debris 28 can exit the net 22 by simply sliding along the grate 20 of the TED 18. Shrimp 30, which naturally move with the current, are directed through the grate 20 as a result of a portion of the stream flow being forced in a sheeting manner perpendicular to the grate 20 by the spoiler 14. Turtles 24 and fin-fish 26 have a tendency to swim towards the faster moving water created by the spoiler thereby assisting them in exiting the net 22. With no netting above the TED 18 debris 28 does not accumulate and thereby plug the grate 20. Plugging creates fast flowing streams or turbulent water which tend to confuse the turtles 24 and fin-fish 26 and further direct the shrimp catch out of the net 22.

Because many varying and different embodiments may be made within the scope of the inventive concept herein taught and because many modifications may be made in the embodiments herein detailed in accordance with the descriptive requirement of the law, it is to be understood that the details herein are to be interpreted as illustrative and not in any limiting sense.

What is claimed is:

1. A turtle excluder device for inclusion in a trawl net comprising:

a) a hard frame having upstream and down stream ends, side bars and a contiguous array of spaced bar members, said hard frame for attachment within said trawl net transverse to the direction of flow through said net;

b) a hoop attached to said down stream end of the hard frame and extending upstream, generally parallel to direction of flow;

c) a first brace member attached to said hoop at an end opposite said hard frame and to a side bar of said hard frame;

d) a second brace member attached to said hoop opposite said first brace member and opposite said hard frame, and to an opposing side bar of said hard frame; and e) a spoiler transverse to said direction of flow, attached to said hoop, upstream of said hard frame, extending diagonally, and generally perpendicular to said array of spaced bar members.

2. A turtle excluder device according to claim 1, wherein said spoiler is a deflector plate substantially the width of said hoop for directing water toward said array of spaced bar members thus forming a water curtain.

3. A turtle excluder device for inclusion in a trawl net for the exclusion of turtles, fin-fish and debris accumulations comprising:

a) an excluder means for inclusion in said trawl net, said net having an opening provided therein for allowing turtles to escape and debris to be expelled, said excluder further comprising;

b) a hard frame having a contiguous array of spaced bar members and upper and lower ends, for attachment within said trawl net transverse to the direction of flow through said net;

c) a hoop having forward, rear and side members, said rear member being attached to said upper end of said hard frame and extending opposite but parallel to said direction of flow;

d) brace members attached to said hoop at each juncture of said side and forward members and to said hard frame; and e) a spoiler attached to said forward member of said hoop extending downwards and generally perpendicular to said array of spaced bar members, said spoiler also being transverse to said direction of flow.

4. A turtle excluder device for inclusion in a trawl net for the exclusion of turtles, fin-fish and debris accumulations according to claim 3, wherein said spoiler is configured and positioned to direct a sheet of relatively fast flowing water perpendicularly across said hard frame array of said spaced bar members.

5. A turtle excluder device for inclusion in a trawl net for the exclusion of turtles, fin-fish and debris accumulations according to claim 3, wherein said trawl net does not obstruct or otherwise cover said hoop.

6. A hoop attachment for turtle excluder devices comprising:

a) a hoop for attachment to an excluder device, disposed in a manner whereby said hoop provides an unobstructed opening in a trawl net, in front of and above said excluder device when equipped with said hoop and excluder device; and b) a spoiler means attached to said hoop for directing a fast moving current of water in a substantially perpendicular manner towards said excluder device and thereby in effect, forming a water curtain.

7. A method of excluding turtles, fin-fish and debris from a shrimp net using a hard turtle excluder grate installed in said net including the steps of:

a) attaching a hoop, having a spoiler, to said turtle excluder grate;

b) bracing between said hoop and said grate whereby said hoop is held substantially horizontal relative to said turtle excluder;

c) attaching said net securely to said excluder grate, said bracing and to said hoop;

d) removing the net portion encircled by said hoop thereby providing a large aperture in said net;

e) towing said net having said excluder grate, hoop and spoiler through the water;

f) producing a fast moving water curtain issuing from said spoiler directed towards said excluder grate;

g) allowing fin-fish, turtles and debris to pass through said water curtain and away from said net unobstructed; and h) directing shrimp through said excluder grate into said net as a result of said fast moving water being directed towards said grate by said spoiler.

* * * * *